United States Patent
Park et al.

(10) Patent No.: US 7,177,508 B2
(45) Date of Patent: Feb. 13, 2007

(54) OPTICAL CABLE HAVING AN IMPROVED COMPRESSION STRENGTH CHARACTERISTIC

(75) Inventors: Kyung-Tae Park, Gumi-si (KR); Hee-Goo Kang, Andong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 13 days.

(21) Appl. No.: 10/991,613

(22) Filed: Nov. 18, 2004

(65) Prior Publication Data
US 2005/0271337 A1 Dec. 8, 2005

(30) Foreign Application Priority Data
Jun. 3, 2004 (KR) ...................... 10-2004-0040404

(51) Int. Cl.
*G02B 6/44* (2006.01)
(52) U.S. Cl. ...................... 385/113; 385/100; 385/109; 385/112; 385/110
(58) Field of Classification Search ................ 385/100, 385/109, 110, 112, 113
See application file for complete search history.

(56) References Cited

U.S. PATENT DOCUMENTS

| | | | | |
|---|---|---|---|---|
| 5,651,082 A | * | 7/1997 | Eoll | 385/114 |
| 5,789,701 A | * | 8/1998 | Wettengel et al. | 174/41 |
| 5,825,957 A | * | 10/1998 | Song | 385/113 |
| 5,999,676 A | * | 12/1999 | Hwang | 385/106 |
| 6,236,791 B1 | * | 5/2001 | Lausch et al. | 385/110 |
| 6,671,441 B1 | * | 12/2003 | Bocanegra et al. | 385/112 |
| 2003/0202758 A1 | * | 10/2003 | Ardouin | 385/111 |
| 2004/0125698 A1 | * | 7/2004 | George et al. | 367/20 |
| 2004/0258375 A1 | * | 12/2004 | Honjo et al. | 385/103 |
| 2005/0013566 A1 | * | 1/2005 | Storaasli et al. | 385/113 |

FOREIGN PATENT DOCUMENTS

EP   0814355 A1   12/1997

* cited by examiner

*Primary Examiner*—Frank G. Font
*Assistant Examiner*—Michael P. Mooney
(74) *Attorney, Agent, or Firm*—Cha & Reiter, L.L.C.

(57) ABSTRACT

An optical fiber having improved compression strength is disclosed. The optical fiber includes a central tension member positioned in the center of the optical fiber and having at least one groove, at least one metal tube seated in the groove and containing at least one optical fiber, a strength member positioned around the central tension member and the tube, and a sheath positioned around the strength member.

17 Claims, 4 Drawing Sheets

OPTICAL CABLE HAVING AN IMPROVED COMPRESSION STRENGTH CHARACTERISTIC

CLAIM OF PRIORITY

This application claims priority to an application entitled "optical cable having high compression strength," filed with the Korean Intellectual Property Office on Jun. 3, 2004 and assigned Serial No. 2004-40404, the contents of which are hereby incorporated by reference.

BACKGROUND OF THE INVENTION

1. Field of the Invention

The present invention relates to an optical cable, and more particularly to an optical cable having an improved compression strength characteristic as compared to conventional optical cables.

2. Description of the Related Art

Conventional optical cables may be classified according to the installation method of the optical cable. For example, duct line optical cables are installed in ducts that have been buried in the ground; buried optical cables are directly buried in the ground; and aerial optical cables are installed in the air using poles.

FIG. 1 shows a typical buried optical cable. The optical cable 100 includes a central tension member 110, a plurality of tubes 140, a binder 150, a first sheath 160, a tension member 170, and a second sheath 180.

The central tension member 110 is positioned in the center of the optical cable 100. It may be a rod type member having a circular sectional shape. It provides the optical cable 100 with tensile strength.

The tubes 140 are positioned around the central tension member 110. They are oriented parallel to the central tension member 110 and have a hole in the center thereof. A plurality of optical fibers 120 is positioned in the hole of the tubes 140. The space within the tubes 140 is filled with jelly 130. The jelly 130 absorbs moisture that has penetrated into the tubes 140.

The binder 150 is positioned around the plurality of tubes 140. It is of a tape type and surrounds the tubes 140 to hold them.

The first sheath 160 is positioned around the tubes by an extrusion process.

The tension member 170 is positioned around the first sheath 160. It may be helically wound around the first sheath 160. The tension member 170 provides the optical cable 100 with tensile strength and may include a number of aramid yarns.

The second sheath 180 is positioned around the tension member 170 by an extrusion process.

Use of such a typical buried optical cable 100 requires that a trench be dug in the ground for installation, which is a costly procedure considering both time and money. In the case of using a duct line optical cable, the ground must also be dug before installing conduct lines.

The conduct line optical cable and the buried optical cable have low compression strength and cannot be installed on the ground while being directly exposed to external environment.

Accordingly, there is a need in the art for an optical cable that has improved compression strength and can be installed on the ground, e.g., on the ballasts near railroads. Such an optical cable must be able to withstand a certain loads, e.g., a load from a track vehicle for railroad maintenance.

SUMMARY OF THE INVENTION

Accordingly, one aspect of the present relates to an optical cable having improved compression strength so that it can be directly installed on the ground.

One embodiment of the present invention is directed to an optical fiber comprising: a central tension member positioned in the center of the optical fiber and having at least one groove; at least one metal tube seated in the groove and containing at least one optical fiber; a strength member positioned around the central tension member and the tube; and a sheath positioned around the strength member.

BRIEF DESCRIPTION OF THE DRAWINGS

The above and other aspects, features and embodiments of the present invention will be more apparent from the following detailed description taken in conjunction with the accompanying drawings, in which.

DETAILED DESCRIPTION

Hereinafter, embodiments of the present invention will be described with reference to the accompanying drawings. For the purposes of clarity and simplicity, a detailed description of known functions and configurations incorporated herein will be omitted as it may make the subject matter of the present invention unclear.

Figure 2:
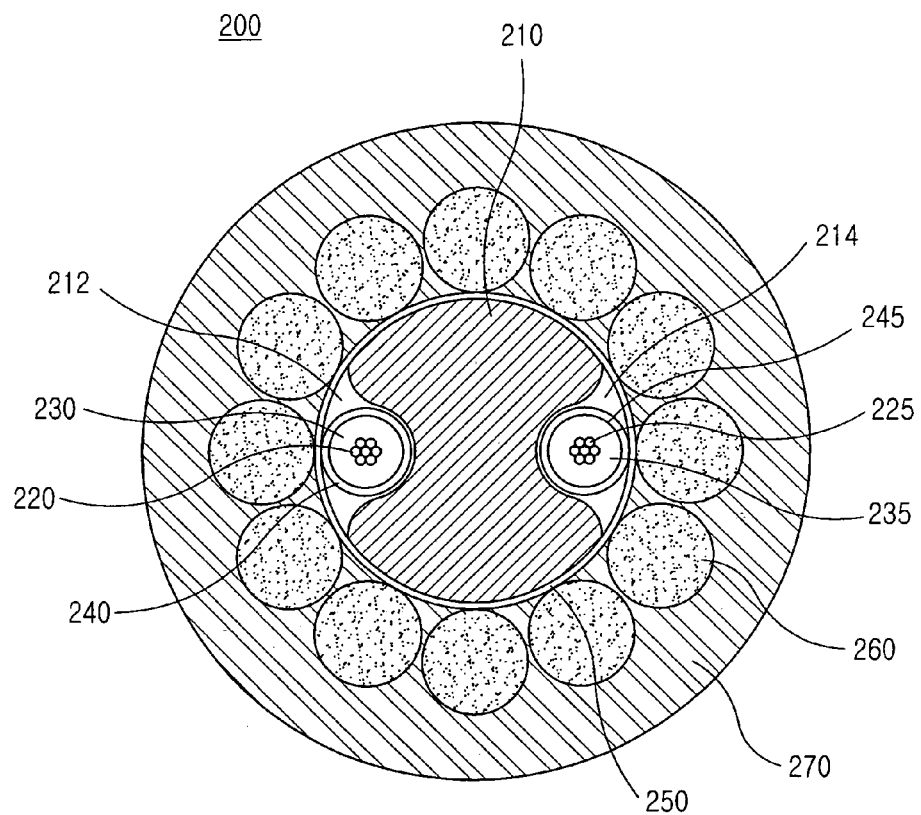
FIG. 2 shows an optical cable according to one embodiment of the present invention.

Referring to FIG. 2, an optical cable according to one embodiment of the present invention is shown. The optical cable 200 includes a central tension member 210, first and second tubes 240 and 245, a binder 250, a strength member 260, and a sheath 270.

The central tension member 210 is substantially positioned in the center of the optical cable 200. The central tension member 210 has first and second grooves 212 and 214 that may be positioned symmetrically about the central axis of the optical cable 200. It is noted that other positions for the grooves are possible. The central tension member 210 may be made of metallic material, e.g., an aluminum material. It is noted that other non-metallic materials are possible that provide similar strength characteristics. The central tension member 210 provides the optical cable 200 with tensile strength.

In various embodiments, the central tension member 210 may be twisted in clockwise direction, in counterclockwise direction, or in a combination thereof (i.e., a portion of the central tension member is twisted in clockwise direction and another portion thereof in counterclockwise, and these portions intersect) about the central axis thereof (i.e., the central axis of the optical cable). As a result, the first and second grooves 212 and 214 are wound about the central axis helically or in S-Z mode. The central tension member 210, which is made of materials noted above, can withstand an improved compression load as compared to conventional members. The central tension member 210 maintains the linearity of the optical cable 200. It may also provide flame retardancy. In one embodiment, the central tension member 210 has an outer diameter of 7.54 mm. The S-Z mode is disclosed in U.S. Pat. No. 4,828,352 of Heinrich A. Kraft, entitled "S-Z stranded optical cable" (the contents of which are hereby incorporated by reference), and detailed description thereof will be omitted.

The first and second grooves 212 and 214 have a depth that is smaller than the diameter of the tubes 240 and 245 and a width that is larger than the diameter of the tubes 240 and 245. This is for the purpose of minimizing the influence of deformation of the tubes 240 and 245, due to external impact, by giving the first and second grooves 212 and 214 a concave shape.

The first and second tubes 240 and 245 are seated within the first and second grooves 212 and 214 and are twisted around the central tension member 210 helically or in S-Z mode. The tubes 240 and 245 may have the shape of a hollow cylinder. It is noted that other shapes are possible, e.g., a hollow oval. A plurality of optical fibers 220 and 225 is contained in the hole of the tubes 240 and 245. The space within the tubes 240 and 245 is filled with jelly 230 and 235 for absorbing the moisture that has penetrated into the tubes 240 and 245. The first and second tubes 240 and 245 are made of metallic material, e.g., a steel material. It is noted that other non-metallic materials are possible that provide similar strength characteristics. The tubes 240 and 245, which are twisted helically or in S-Z mode, provide a free window during tensioning of the optical cable 200. Accordingly, the optical fibers 220 and 225 within the tubes 240 and 245 are not subject to stress up to certain degree. The tubes 240 and 245 have an outer diameter of 2.5 mm.

The binder 250 surrounds the central tension member 210 and the first and second tubes 240 and 245. The grooves 212 and 214, which are sealed by the binder 250, may be filled with UV-curable material and then cured by UV irradiation. The binder 250 includes a waterproof tape, which prevents moisture from penetrating into the interior thereof.

The strength member 260, which is positioned around the binder 250, provides the optical cable 200 with improved compression strength as compared to conventional members. The strength member 260 is made of metallic material, e.g., a steel material. It is noted that other non-metallic materials are possible that provide similar strength characteristics. The strength member 260 may be wound helically around the binder 250. Jelly is applied on the outer peripheral surface of the strength member 260 so that the strength member 260 does not adhere to the sheath 270. This makes it easy to peel the sheath 270 off. The strength member 260 includes a number of steel rods, and jelly is applied on the outer peripheral surface of the steel rods. In one embodiment, the steel rods have an outer diameter of 2.55 mm.

The sheath 270 may be positioned around the strength member 260 by an extrusion process. The sheath 270 prevents the danger of electric shock by insulating the strength member 260, when it is made of a metallic material, from electric contact. The sheath 270 provides high compression strength. The sheath 270 is made of plastic material, preferably of flame retardant material. When the sheath 270 is made of flame retardant material, it prevents a fire from spreading. For example, the flame retardant material may be formed of a substance, such as PE (polyethylene) and EVA (ethylene vinylacetate copolymer), and an additive, such as aluminum oxide and magnesium oxide.

Figure 3:
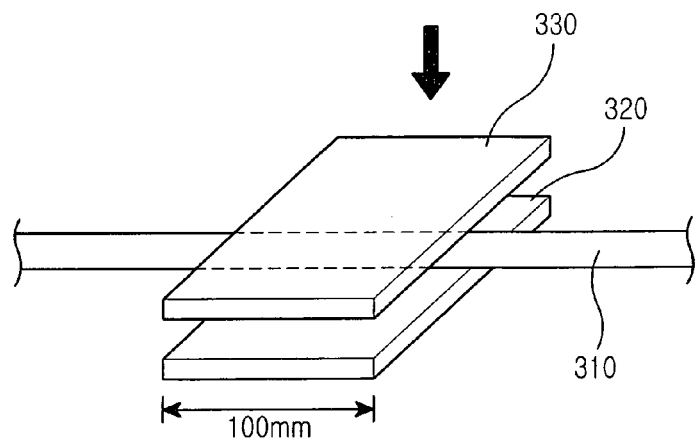
FIG. 3 illustrates a method for testing the compression strength of optical cables.

Referring to FIG. 3, a method for testing the compression strength of optical cables is illustrated. In this method, an optical cable 310 is interposed between upper and lower steel plates 320 and 330, and a load is applied to the upper steel plate 330. The optical cable 310 has at least one optical fiber mounted thereon. An optical signal is input to an end of the optical fiber, and an optical loss is measured from the optical signal, which is output from the other end of the optical fiber. The upper and lower steel plates 320 and 330 have an area of 100×100 mm².

Figure 4:
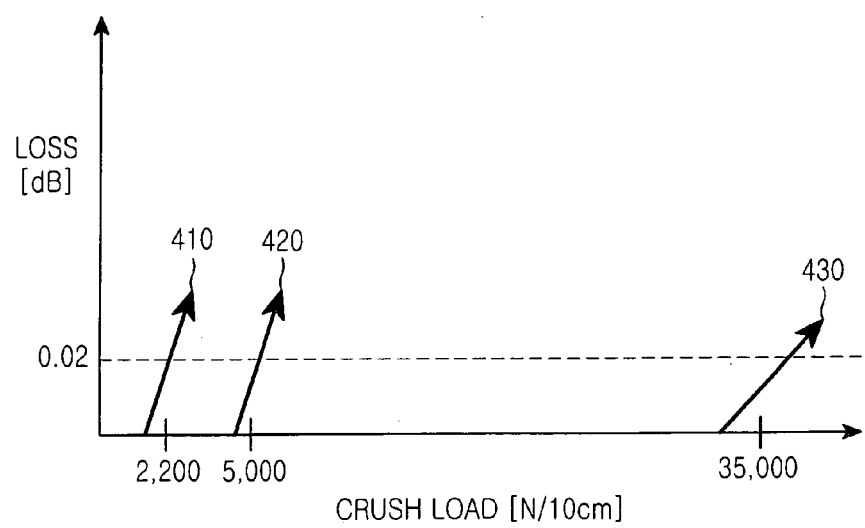
FIG. 4 shows the comparison in compression strength between the optical cable shown in FIG. 2 and typical optical cables.

Referring to FIG. 4, the comparison in compression strength between the optical cable shown in FIG. 2 and typical optical cables is illustrated. A compression strength test is performed as disclosed with reference to FIG. 3. According to general international standards regarding the compression strength of optical cables, a crush load, which corresponds to a reference optical loss of 0.02 dB, is indicated as compression strength. FIG. 4 shows a compression strength curve 410 of a typical duct line optical cable, a compression strength curve 420 of a typical buried optical cable, and a compression strength curve 430 of the optical cable 200 shown in FIG. 2. As shown, it is clear that the optical cable 200 has an improved compression strength compared with typical optical cables.

Figure 5:
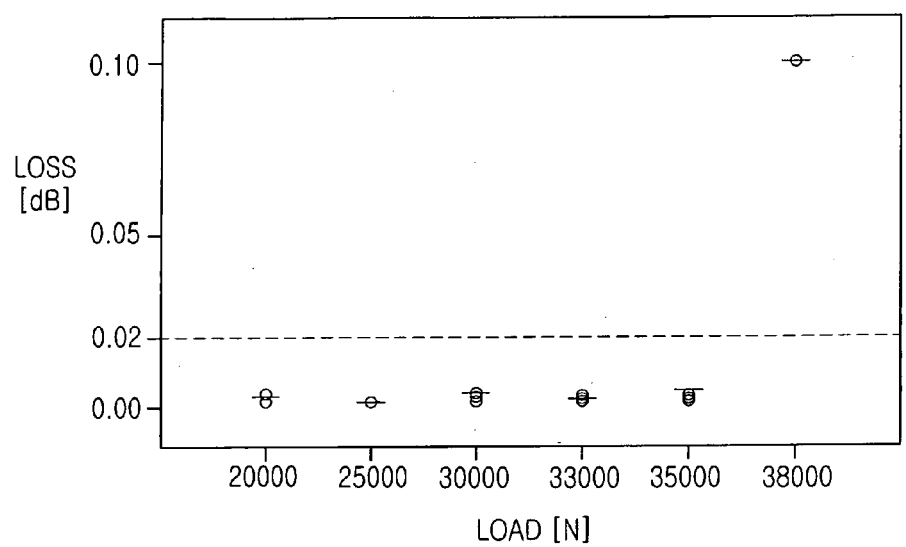
FIG. 5 shows in detail the compression strength of the optical cable shown in FIG. 2.

Referring to FIG. 5, the compression strength of the optical cable shown in FIG. 2 is illustrated in detail. A compression strength test is performed as disclosed with reference to FIG. 3. Each target load (20,000, 25,000, . . . , 38,000N) is maintained for one minute while an optical loss is measured.

Figure 1:
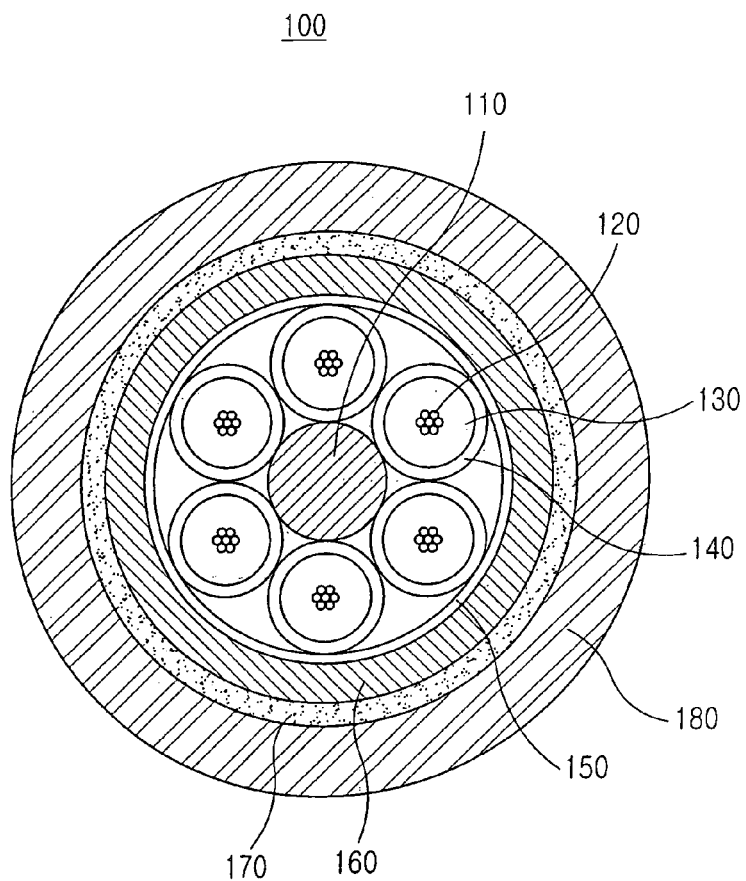
FIG. 1 shows a typical buried optical cable.

As a result of performing a fire test on the optical cable 200 shown in FIG. 2 and the optical cable 100 shown in FIG. 1, the jelly 230 and 235 and the optical fibers 220 and 225 within the tubes 240 and 245 of the optical cable 200 have not been damaged at all, but the jelly 130 and the optical fiber 120 within the tube 140 of the typical buried optical cable 100 have been damaged.

While the invention has been shown and described with reference to certain embodiments thereof, it will be understood by those skilled in the art that various changes in form and details may be made therein without departing from the spirit and scope of the invention as defined by the appended claims.

What is claimed is:

1. An optical fiber cable comprising:
   a central tension member substantially positioned at the center of the optical fiber cable, and the central tension member having at least one groove formed therein;
   at least one metal tube seated in the groove and containing at least one optical fiber;
   a strength member positioned around the central tension member and the tube; and
   a sheath positioned around the strength member, wherein substantially half of outer surface of the tube is circumferentially covered by the groove, and wherein the optical fiber cable has an optical loss equal to or less than 0.02dB when a load of 35,000N is applied to the optical fiber cable for one minute.

2. The optical fiber cable as claimed in claim 1 further comprising a binder interposed between the central tension member and the strength member, as well as between the tube and the strength member, to surround the central tension member and the tube.

3. The optical fiber cable as claimed in claim 2, wherein the binder includes a waterproof tape.

4. The optical fiber cable as claimed in claim 1, wherein the groove of the central tension member is filled with UV-curable material.

5. The optical fiber cable as claimed in claim 1, wherein the interior of the tube is filled with jelly.

6. The optical fiber cable as claimed in claim 1, wherein the central tension member, the tube, and the strength member are made of metallic materials.

7. The optical fiber cable as claimed in claim 6, wherein the central tension member is made of aluminum material.

8. The optical fiber cable as claimed in claim 6, wherein the tube and the strength member are made of steel material.

9. The optical fiber cable as claimed in claim 6, wherein the strength member includes a number of steel rods, and jelly is applied on the outer peripheral surface of the steel rods.

10. The optical fiber cable as claimed in claim 1, wherein the central tension member has a plurality of grooves positioned symmetrically about the central axis thereof, the optical fiber cable has a plurality of metal tubes, and each of the tubes is seated in each of the grooves.

11. The optical fiber cable as claimed in claim 1, wherein the groove has a depth which is smaller than the diameter of the tube and a width which is larger than the diameter of the tube.

12. An optical fiber cable comprising:
at least one tube containing at least one optical fiber;
a tension member being formed to at least partially surrounds the at least one tube;
a strength member that encloses the tension member and the at least one tube; and
a sheath positioned around the strength member, wherein the optical fiber cable has an optical loss equal to or less than 0.02 dB when a load of 35,000N is applied to the optical fiber cable for one minute.

13. The optical fiber cable as claimed in claim 12, wherein the tension member, the tube, and the strength member are made of metallic materials.

14. The optical fiber cable as claimed in claim 13, wherein the central tension member is made of aluminum material.

15. The optical fiber cable as claimed in claim 13, wherein the tube and the strength member are made of steel material.

16. The optical fiber cable as claimed in claim 13, wherein the strength member includes a number of steel rods, and jelly is applied on the outer peripheral surface of the steel rods.

17. The optical fiber cable as claimed in claim 12, wherein the tension member circumferentially surrounds substantially half of outer surface of the at least one tubes.

* * * * *